A. GORDON.
Ship's Log.
No. 219,460. Patented Sept. 9, 1879.
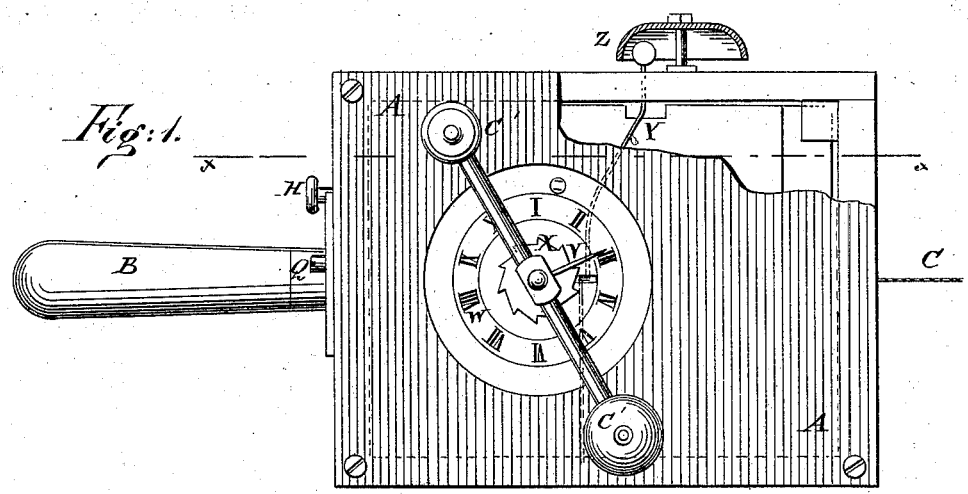
Fig. 1.
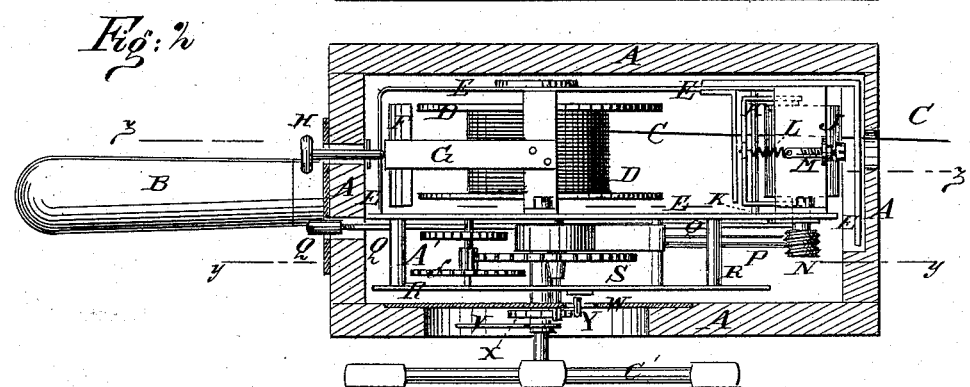
Fig. 2.
Fig. 3.    Fig. 4.
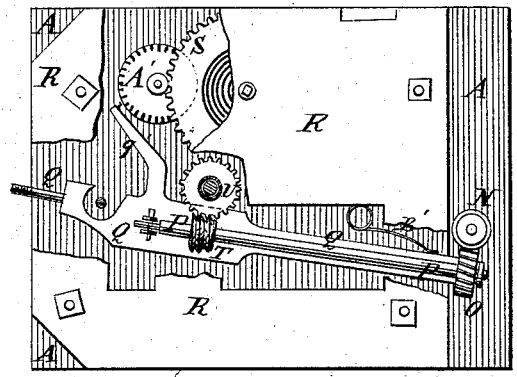
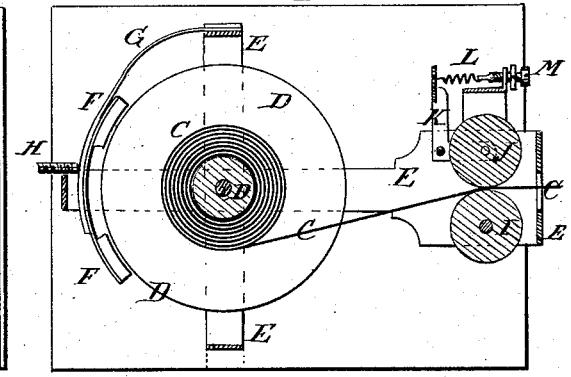
WITNESSES:
Chas. Nida
C. Sedgwick
INVENTOR:
A. Gordon
BY Munn & Co.
ATTORNEYS.
N. PETERS, PHOTO-LITHOGRAPHER, WASHINGTON, D. C.

UNITED STATES PATENT OFFICE.

ALEXANDER GORDON, OF NEW YORK, N. Y.

IMPROVEMENT IN SHIPS' LOGS.

Specification forming part of Letters Patent No. 219,460, dated September 9, 1879; application filed April 4, 1879.

*To all whom it may concern:*

Be it known that I, ALEXANDER GORDON, of the city, county, and State of New York, have invented a new and Improved Ship's Log, of which the following is a specification.

Figure 1 is a front view of my improved device, part of the box or case being broken away. Fig. 2 is a horizontal section of the same, taken through the line $x\ x$, Fig. 1. Fig. 3 is a vertical longitudinal section of the same, taken through the line $y\ y$, Fig. 2. Fig. 4 is a vertical longitudinal section taken through the line $z\ z$, Fig. 2.

Similar letters of reference indicate corresponding parts.

The object of this invention is to furnish an improved ship's log, which shall be so constructed as to count and register the number of knots run out in a quarter of a minute, and also indicate the knots by sound, which shall be so constructed that it can be readily used by one man, and which shall be simple in construction and reliable in use.

The invention consists in the combination of the two rollers, the bent levers, the spring, the adjusting-screw, the two sets of worms and worm-wheels, the shaft and lever, and the pointer and dial with the line, for measuring and registering the length of line that runs off the reel; in the combination of the two rollers, the bent levers, spring, and adjusting-screw, the two sets of worms and worm-wheels, the shaft and lever, and the ratchet-wheel with the line and the spring hammer-handle of the gong, for sounding the said gong as each knot of the line runs out; in the combination of the arm, the notched wheel, the clock-work, and the spring with the two rollers, the bent levers, spring, and adjusting-screw, the two sets of worms and worm-wheels, the shaft and lever, and the pointer and dial, for starting the mechanism and throwing it out of gear automatically at exactly the end of a quarter of a minute; and in the combination of the brake, spring, and push-pin with the reel, for controlling the unwinding of the line from the said reel, as hereinafter fully described.

A represents box, which incloses the operating mechanism. To one end of the box A is attached a handle, B, and in its other end is a slot for the line C to run through.

The outer end of the line C is attached to the drag, which drag is not shown in the drawings, and its other end is attached to the reel D, pivoted to a frame E, secured to and within the box A.

F is a brake, suspended by a spring, G, from a cross-bar of the frame E, and which is pressed against the flanges of the reel D by a pin, H, passing in through the end of the box A. The line C passes out between two rollers, I J, the lower one, I, of which is pivoted to the frame E, that supports the reel D. The upper roller, J, is pivoted to the ends of the lower arms of two bent levers, K, which are pivoted at their angles to the frame E. The ends of the upper arms of the levers K are connected by a cross-bar, to which is attached the end of a spiral spring, L, the other end of which is connected with a screw, M, so that the tension of the spring L may be readily adjusted, as may be required, to cause the outward passage of the line C to revolve the rollers I J without slipping, so that the amount of cord run out may be accurately measured upon the said rollers. This construction also allows the upper roller to yield to allow any unevenness or knots of the line to pass through.

To the journal of the lower roller, I, is attached a worm or endless screw, N, into the threads of which mesh the threads of a worm-wheel, O, formed upon or attached to the end of the shaft P. The shaft P revolves in bearings attached to the lever Q, which is pivoted to the frame R of the clock-work S. The clock-work S is constructed and driven by a spring in the usual way.

To the shaft P is attached a worm or endless screw, T, the threads of which mesh into the teeth of the worm-wheel U, attached to a sleeve which works loosely upon the projecting shaft of the reel D, and to the outer end of which is attached a pointer, V, which moves around the dial W and points to the division-marks of the said dial, the said division-marks representing knots.

To the outer end of the sleeve of the worm-wheel U is also attached a ratchet-wheel, X, the teeth of which equal in number the number of division-marks upon the dial. The teeth of the ratchet-wheel X rest against a projection or pin formed upon or attached to the spring hammer-handle Y of the gong Z, so that the said gong Z may be struck as each knot is run out. The gong Z may be placed without or within the box A, as may be desired.

Upon the lever Q is formed an arm, $q'$, having a point or knife-edge formed upon or attached to its end, which rests upon the face of the wheel A' and drops successively into the notches formed in the said face. The wheel A' is attached to such a shaft of the clock-work S that the said wheel A' may be exactly a quarter of a minute in moving through the space of one notch, so that the clock-work will be stopped instantly at the end of a quarter of a minute. As the clock-work is stopped the worm-wheel O is thrown out of gear with the worm N by a spring, B', which presses against the lever Q, so that the line can be drawn in without operating the mechanism.

The reel is turned to wind up the line C by a balanced crank, C', attached to the end of its shaft. The end of the lever Q projects through a slot in the end of the box A, near the handle B, so that it can be conveniently operated to release the clock-work instantly at the proper time. With this construction the clock-work is started, when the drag is thrown out, by operating the lever Q, to withdraw its arm $q'$ from the wheel A' and allow the clock-work to start, which clock-work is stopped automatically at the end of a quarter of a minute, and the number of knots is read from the dial W, or they may be known by counting the strokes of the gong. The line is then drawn in and the pointer V is turned back to the zero-mark of the dial W, leaving the machine ready for instant use when again required.

Having thus fully described my invention, I claim as new and desire to secure by Letters Patent—

1. The combination of the two rollers I J, the bent levers K, the spring L, the adjusting-screw M, the two sets of worms and worm-wheels N O and T U, the shaft and lever P Q, and the pointer and dial V W, with the line C, for measuring and registering the length of line that runs off the reel D, substantially as herein shown and described.

2. The combination of the two rollers I J, the bent levers, spring, and adjusting-screw K L M, the two sets of worms and worm-wheels N O and T U, the shaft and lever P Q, and the ratchet-wheel X with the line C and the spring hammer-handle Y of the gong Z, for sounding the said gong as each knot of the said line C runs out, substantially as herein shown and described.

3. The combination of the arm $q'$, the notched wheel A', the clock-work S, and the spring B' with the two rollers I J, the bent levers, spring, and adjusting-screw K L M, the two sets of worms and worm-wheels N O and T U, the shaft and lever P Q, and the pointer and dial V W, for starting the mechanism and throwing it out of gear automatically at exactly the end of a quarter of a minute, substantially as herein shown and described.

4. The combination of the brake, spring, and push-pin F G H with the reel D, for controlling the unwinding of the line from the said reel D, substantially as herein shown and described.

ALEXANDER GORDON.

Witnesses:
JAMES T. GRAHAM,
C. SEDGWICK.